(12) United States Patent
Gerber

(10) Patent No.: US 6,464,191 B1
(45) Date of Patent: Oct. 15, 2002

(54) SKID FOR SUPPORTING LOADS

(76) Inventor: Warren Gerber, 2006 Rose Ct., Basking Ridge, NJ (US) 07920

( * ) Notice: Subject to any disclaimer, the term of this patent is extended or adjusted under 35 U.S.C. 154(b) by 0 days.

(21) Appl. No.: 09/268,452

(22) Filed: Mar. 12, 1999

(51) Int. Cl.[7] ............................................. A47B 91/00
(52) U.S. Cl. ................... 248/346.01; 108/51.11
(58) Field of Search ................. 248/346.01, 346.02, 248/346.03; 108/51.11, 56.1, 56.3, 57.17

(56) References Cited

U.S. PATENT DOCUMENTS

| | | | |
|---|---|---|---|
| 1,690,873 A | 11/1928 | O'Neil | |
| 2,287,740 A * | 6/1942 | Klouman | 108/56.1 |
| 2,611,569 A * | 9/1952 | Coleman et al. | 108/51.32 |
| 3,010,409 A * | 11/1961 | De Good et al. | |
| 3,026,817 A * | 3/1962 | Sebastian et al. | |
| 3,131,656 A * | 5/1964 | Houle | 108/56 |
| 4,077,334 A * | 3/1978 | Svirklys | 108/56.1 |
| 4,145,976 A * | 3/1979 | Svirklys | 108/56.1 |
| 4,382,414 A * | 5/1983 | Svirklys | 108/56.1 |
| 4,485,744 A | 12/1984 | Umemura et al. | 108/51.1 |
| 4,597,339 A * | 7/1986 | McCaffrey et al. | 108/51.1 |
| 4,841,880 A * | 6/1989 | Ferguson | 108/51.1 |
| 4,898,102 A * | 2/1990 | Thebeau | 108/56.1 |
| 4,960,209 A | 10/1990 | Tudor | 206/597 |
| 5,101,737 A | 4/1992 | Gomez | 108/51.1 |
| 5,333,555 A * | 8/1994 | McPhee | 108/5.1 |
| 5,367,960 A | 11/1994 | Schleicher | 108/51.1 |
| 5,425,314 A | 6/1995 | MacFarland | 108/51.3 |
| 5,440,998 A | 8/1995 | Morgan et al. | 108/51.1 |
| 5,456,189 A | 10/1995 | Belle Isle | 108/51.1 |
| 5,460,103 A | 10/1995 | Dunn et al. | 108/51.1 |
| 5,687,653 A | 11/1997 | Bumganer | 108/51.1 |
| 5,809,907 A | 9/1998 | Bumgarner | 108/51.11 |

* cited by examiner

Primary Examiner—S. Joseph Morano
Assistant Examiner—Frantz F. Jules
(74) Attorney, Agent, or Firm—John N. Bain; Raymond J. Lillie

(57) ABSTRACT

A reusable skid for receiving stacked sheets which includes a pair of spaced-apart, longitudinal rails and a pair of spaced-apart, transverse members which extend over the rails. The transverse members are not fastened to the rails, and thus the skids may be assembled and disassembled easily.

4 Claims, 2 Drawing Sheets

SKID FOR SUPPORTING LOADS

This invention relates to a skid or pallet for supporting loads such as stacked metal sheets. More particularly, this invention relates to skids or pallets including at least two generally hollow rails and at least one transverse member extending over the top of but unattached to the rails to support a load of sheets one upon the other, which pallet can be assembled and disassembled quickly and easily with the rails nestable in each other.

When supporting heavy loads of stacked sheet metal, ordinary wooden skids in general have a two-use life, after which time they are substantially destroyed creating disposal problems and cost. Also, wooden skids have inconsistent strength characteristics caused by the grade of the wood, the presence of knots, and the types of nails or other fasteners used to hold the skids together. Such skids, in general, may weigh from 75 to 100 pounds or more, stackable only as a permanent assembled unit and are difficult to stack and move, particularly over long distances.

It is therefore an object of the present invention to provide a skid made of a strong, durable, yet lightweight, material, such as steel of other suitable metal which also can be assembled and disassembled quickly without fasteners and wherein parts of the skid can be nested in each other for storage or transport.

Another object of the present invention is to provide a pallet or skid to which a stack of sheets can be strapped by passing a strap from within one or both of two hollow, spaced-apart rails upwardly around the load, trapping at least one transverse member extending across the tops of the rails between the top of the rails and beneath the stacked load.

Still another object of the present invention is to provide a pallet or skid having means at the bottom of the spaced-apart rails to reduce the likelihood of unacceptable damage to the top sheet of loads on other pallets stacked therebeneath.

Yet still another object of the present invention is to provide a pallet or skid having at least one transverse member extending across the tops of at least two, parallel, spaced-apart rails, the transverse member having means on the bottom thereof for positioning the transverse member on the rails and for inhibiting transverse sliding movement transversely across the rails.

Yet still a further object of the present invention is to provide a pallet or skid which can be lifted by a fork lift from both ends and both sides.

In accordance with one embodiment of the present invention, there is provided a reusable skid for supporting a load, such as, for example, stacked metal sheets. The skid comprises at least one pair of spaced-apart, longitudinal hollow rails and at least one transverse member extending transversely across the rails but not fastened thereto. Each of the rails has a top side member, a pair of downwardly depending side members, each side member having a pair of opposed inwardly extending flanges which define a non-gouging engagement with the load on a skid stacked beneath.

In one embodiment of the invention a pair of spaced-apart transverse members extend across the tops of the respective spaced-apart rails. Each of the spaced-apart, transverse members further include two pairs of downwardly extending, spaced-apart flanges on its surface engaging the rails. Each pair of downwardly extending, spaced-apart flanges is generally normal to the longitudinal axis of the transverse member. Each flange of each pair of spaced-apart flanges is spaced apart from the other companion flange a distance at least as great as and preferably generally the same as the width of the respective top of the rail to which it is engaged. These pairs of downwardly extending flanges are themselves spaced-apart the same distance as the separation between the rails.

In one embodiment, each downwardly depending side member of each rail has a pair of opposing openings. In such an embodiment, the skid can be accessed by the forks of a forklift by inserting the forks between the downwardly depending side members of the rails, or by inserting the forks through the openings in the downwardly depending side members.

In another embodiment, each transverse member includes a pair of upwardly extending flanges. The flanges are disposed generally at opposite ends of the transverse member. Such flanges aid in keeping loads, such as loads of stacked metal sheets, from moving off the skid.

The core elements of the skid of the present invention are assembled without resort to fastening means such as nails, brads, screws, rivets, glue, cement, solder, spot welds, clamps, or other fastening means. The skid may be assembled first by placing a pair of spaced-apart, longitudinal rails, upon a support. In a preferred embodiment, a guide member is extended into an open end of each spaced-apart rail to insure that the rails are parallel and spaced properly to receive the transverse members. At least one but usually a pair of spaced-apart, transverse members, constructed as hereinabove described, are laid upon the tops of rails. The downwardly extending, spaced-apart flanges of the transverse members extend downwardly over the downwardly depending side members of the rails, thereby forming the skid. The transverse members preferably fit snugly over the rails such that the transverse members will not slide transversely across the tops of the rails.

In general, the skid is made of a material which is strong, yet lightweight, including lightweight metals, such as steel or aluminum. Thus, the loaded skid can be moved easily from place to place, and can be stacked one upon the other. Further strength and rigidity is provided to the skid by the opposed inwardly extending, flanges at the bottom of the side members of the rails. Such flanges also permit the skids to be stacked one upon the other without gouging the top sheet of the load immediately beneath the flange. It is to be understood, however, that the scope of the present invention is not to be limited to any specific material of which the skid may be constructed.

Because the skid is assembled by positioning without attaching the transverse members to the rails, the skid can be disassembled easily. The parts may be stored in a compact space or transported from place to place disassembled. In addition, the rails can be nested for compaction.

Once the skid of the present invention is assembled, it may be used to support a load, such as a stack of metal sheets. A stack of sheets may be placed upon the transverse members, and the stack of sheets can be secured to the skid firstly by extending a fastening strap longitudinally through each of the rails and then upwardly around the stack. The ends of the fastening strap then are secured by conventional means. The load is thereby fastened to the skid and the core elements secured tightly in position without attachment one to the other.

The invention now will be described with respect to the drawings, wherein.

Figure 1:
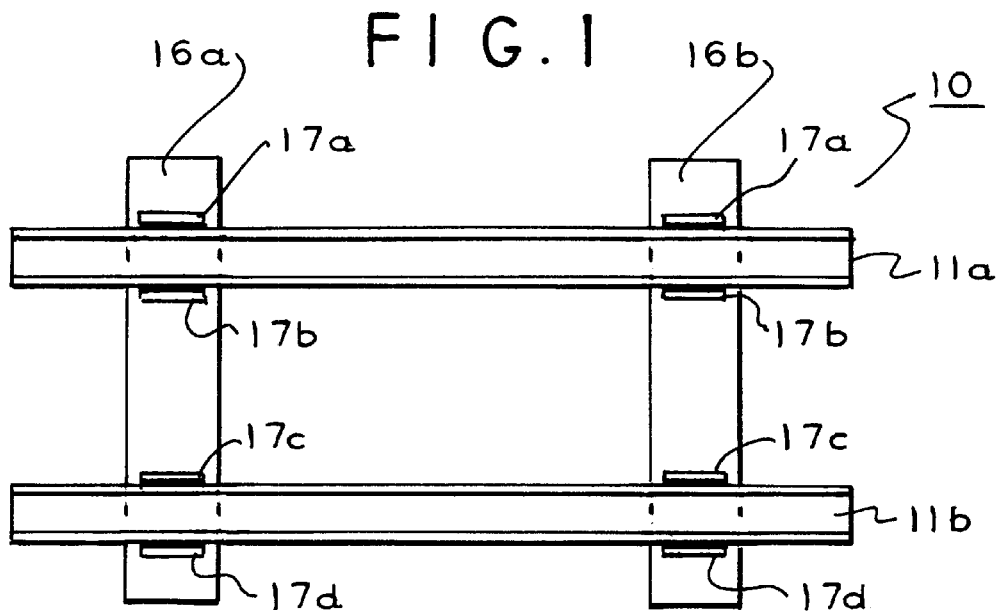
FIG. 1 is a bottom view of an embodiment of the skid of the present invention.

Referring now to the drawings, a skid 10 includes hollow rails 11a and 11b, and transverse members 16a and 16b. Rails 11a and 11b are identical in construction, and transverse members 16a and 16b are identical in construction.

Figure 2:
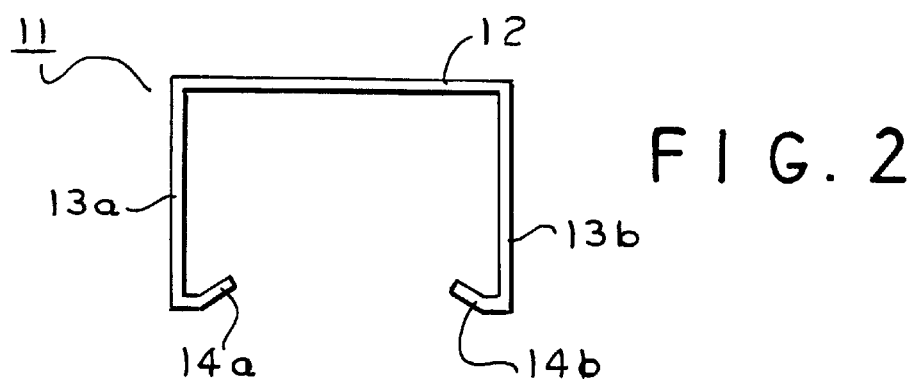
FIG. 2 is a cross-sectional view of a rail of the skid.
Figure 2A:
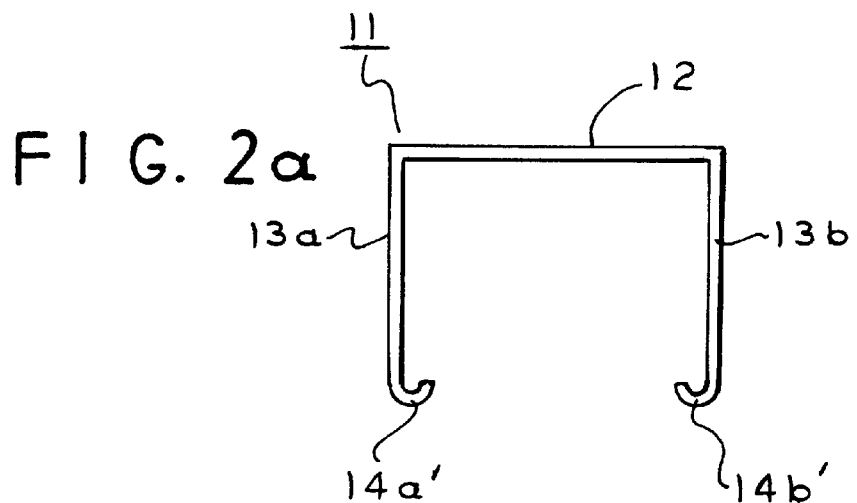
FIG. 2a is an alternative form of the rail shown in FIG. 2.
Figure 3:
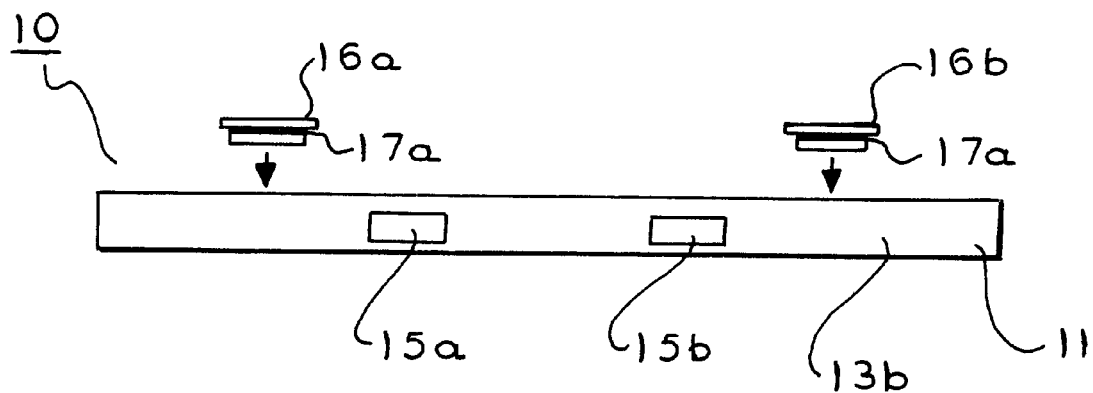
FIG. 3 is an exploded side view of an embodiment of the skid showing openings in the side of the rail.
Figure 4:
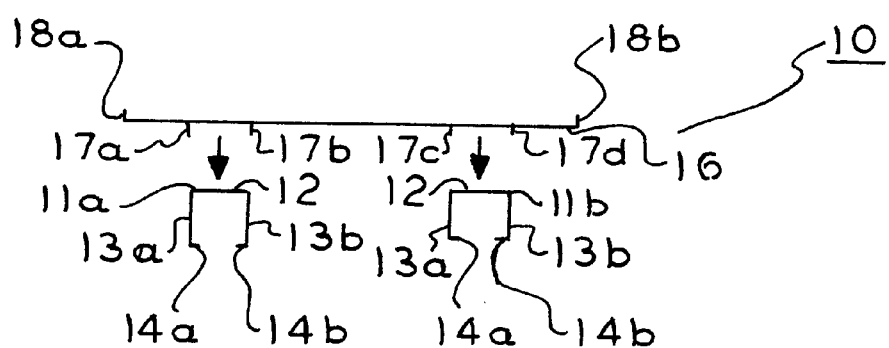
FIG. 4 is an exploded cross-sectional view of the rails and a transverse member of the skid.

A rail 11 includes a top member 12, a pair of downwardly depending side members 13a and 13b, and a pair of opposed inwardly and upwardly extending flanges 14a and 14b at the bottom of each side member. While shown extending inwardly and upwardly, the flanges may be inwardly but downwardly arcuate as shown in FIG. 2a at 14a' and 14b'. Each of the downwardly depending side members 13a and 13b of a rail 11 may include openings 15a and 15b which are designed to receive the forks of a forklift such that the skid 10 may be accessed by a forklift by inserting the forks through openings 15a and 15b in sides 13a and 13b of rails 11a and 11b.

Each transverse member 16 includes a first pair of downwardly extending, spaced-apart flanges 17a and 17b, and a second pair of spaced-apart flanges 17c and 17d. Each pair, 17a and 17b, and 17c and 17d of spaced-apart flanges is normal to the longitudinal axis of transverse member 16, and the inner flange of each pair, 17a and 17b, and 17c and 17d of spaced-apart flanges are themselves spaced apart a distance generally equal to the distance between the inside side member of each of the rails 11a and 11b. Each transverse member 16 also may include upwardly extending flanges 18a and 18b, located generally at opposite ends of each transverse member 16. The upwardly extending flanges 18a and 18b aid in preventing loads from sliding transversely off the skid 10.

The skid 10 is constructed by placing rails 11a and 11b on a support such that the flanges 14a and 14b of rails 11a and 11b contact the support, such as a floor or other appropriate surface. The rails 11a and 11b are spaced apart such that they are parallel and that transverse members 16a and 16b fit over them properly. Such can be accomplished by extending a pair of guide members (not shown) into the open ends of rails 11a and 11b to insure that the rails are parallel and spaced properly to receive the transverse members 16a and 16b. Transverse members 16a and 16b then are placed upon rails 11a and 11b such that the flanges 17a and 17b fit snugly beside sides 13a and 13b of rail 11a, and flanges 17c and 17d fit snugly beside sides 13a and 13b of rail 11b. The transverse members 16a and 16b are spaced apart at a distance which enables the transverse members 16a and 16b of skid 10 to support heavy loads, and to provide for an even distribution of the weight of a load upon the skid.

The skid 10 may be employed to support a wide variety of loads, including loads of metal sheets. For example, a stack of metal sheets may be placed upon skid 10. The flanges 18a and 18b at the ends of transverse members 16a and 16b aid in preventing the stack of metal sheets from falling off skid 10. Once the stack of metal sheets is placed upon the skid 10, a fastening strap (not shown) is extended through rails 11a and 11b and over the top of the stack of metal sheets. The ends of fastening strap then are secured together, whereby the stack of metal sheets is secured to the skid.

The load bearing skids may be stacked one upon the other. The rails 11a and 11b include inwardly and upwardly extending flanges 14a and 14b, which prevent gouging the top sheet of a load on a skid stacked beneath.

Because the rails 11a and 11b and the transverse members 16a and 16b are not fastened together by fastening means, the skid 10 may be disassembled easily by cutting the strap, removing the load and removing transverse members 16a and 16b from rails 11a and 11b. The rails 11 are constructed such that, when the skid 10 is disassembled, the rails 11 may be nested together such that a side member 13a or 13b of a rail is placed within the channel of an adjacent rail, thereby enabling the rails 11 to be stored while occupying a minimum of storage space. The ability to disassemble the skids easily also enables one to move the disassembled skids easily from place to place, whereby such skids may be reassembled easily at other locations.

It is to be understood, however, that the scope of the present invention is not to be limited to the specific embodiments described above. The invention may be practiced other than as particularly described and still be within the scope of the accompanying claims.

What is claimed is:

1. A method of securing a stack of sheets to a skid comprising:

placing a pair of spaced-apart, longitudinal rails upon a support, each of said rails having a top side member, a pair of downwardly depending side members, and a pair of opposed, inwardly and upwardly extending flanges;

extending a guide member into each of said spaced-apart rails to insure that said rails are parallel and spaced properly to receive transverse members;

laying a pair of spaced-apart, transverse members upon said rails, each of said transverse members including two pairs of downwardly extending, spaced-apart flanges, each of said pairs of downwardly extending, spaced-apart flanges being located on the bottom side of said transverse member, and each pair of said downwardly extending, spaced-apart flanges being generally normal to the longitudinal axis of said transverse member, and each pair of spaced-apart flanges is spaced apart at a distance at least as great as the distance between the outside of the depending side members of the respective rails, whereby said flanges extend downwardly over said downwardly depending side members of said rails, thereby forming said skid;

placing a stack of sheets upon said transverse members;

extending a fastening strap through each of said rails and above said stack; and securing said fastening strap, whereby said stack is secured to said skid.

2. A skid for supporting a load, comprising:

at least one pair of spaced apart, longitudinal, hollow rails, wherein each rail has a top member and a pair of downwardly depending side members, and wherein each downwardly depending side member of each rail has a pair of diametrically opposed openings to receive supporting means, and is provided with inwardly and upwardly extending flanges defining a relatively smooth engagement with a surface on which the rails are supported; and at least one transverse member extending across and resting on but unattached to the top members of the respective rails.

3. The skid of claim 2 wherein at least one transverse member is provided with at least one pair of generally parallel, downwardly extending flanges, each of said flanges being spaced apart a distance at least as wide as the top member of at least one of the rails.

4. The skid of claim 2 wherein each transverse member includes a pair of upwardly extending flanges, said flanges being disposed at opposite ends of said transverse member.

* * * * *